US011150878B2

(12) United States Patent
Campbell, Jr. et al.

(10) Patent No.: US 11,150,878 B2
(45) Date of Patent: Oct. 19, 2021

(54) METHOD AND SYSTEM FOR EXTRACTING CONCEPTS FROM RESEARCH PUBLICATIONS TO IDENTIFY NECESSARY SOURCE CODE FOR IMPLEMENTATION

(71) Applicant: Raytheon BBN Technologies Corp., Cambridge, MA (US)

(72) Inventors: Newton Henry Campbell, Jr., Washington, DC (US); Ilana Heintz, Silver Spring, MD (US); Jessica MacBride, Severna Park, MD (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 438 days.

(21) Appl. No.: 15/883,786

(22) Filed: Jan. 30, 2018

(65) Prior Publication Data

US 2018/0232215 A1     Aug. 16, 2018

Related U.S. Application Data

(60) Provisional application No. 62/452,597, filed on Jan. 31, 2017.

(51) Int. Cl.
| | |
|---|---|
| *G06F 8/35* | (2018.01) |
| *G06F 8/10* | (2018.01) |
| *G06F 11/36* | (2006.01) |
| *G06F 16/9032* | (2019.01) |
| *G06F 8/36* | (2018.01) |

(Continued)

(52) U.S. Cl.
CPC ................ *G06F 8/35* (2013.01); *G06F 8/10* (2013.01); *G06F 8/36* (2013.01); *G06F 11/3608* (2013.01); *G06F 16/353* (2019.01); *G06F 16/90332* (2019.01); *G06F 40/289* (2020.01)

(58) Field of Classification Search
CPC ..................................... G06F 8/10; G06F 8/36
See application file for complete search history.

(56) References Cited

U.S. PATENT DOCUMENTS

| | | | |
|---|---|---|---|
| 2006/0004725 A1* | 1/2006 | Abraido-Fandino | ........................ G06F 16/951 |
| 2012/0233151 A1* | 9/2012 | Vanderwende | ....... G06F 16/954 707/722 |

(Continued)

OTHER PUBLICATIONS

Cozzie et al., "Macho II: Even More Macho", http://sigops.org/s/conferences/sosp/2011/posters/summaries/sosp11-final51.pdf, accessed on Dec. 9, 2019 (Year: 2011).*

(Continued)

*Primary Examiner* — Doon Y Chow
*Assistant Examiner* — Timothy P Duncan
(74) *Attorney, Agent, or Firm* — Daly, Crowley, Mofford & Durkee, LLP

(57) ABSTRACT

A technique is described including taking a research paper of interest (target paper) and identifying concepts within it based on topic analysis among bibliometric clusters; identifying descriptions of each concept across bibliometric clusters wherein the descriptions will be of varying levels of granularity and will use different terms to describe the same concept or phenomena; using the various descriptions of a concept to create search terms to be used in a repository of annotated, searchable source code snippets; and constructing implementation of target paper's methodologies using source code snippets.

12 Claims, 5 Drawing Sheets

(51) Int. Cl.
*G06F 16/35* (2019.01)
*G06F 40/289* (2020.01)

(56) References Cited

U.S. PATENT DOCUMENTS

2012/0233152 A1* 9/2012 Vanderwende ....... G06F 16/382
                                                707/722
2016/0034514 A1* 2/2016 Singhal ............... G06F 16/9535
                                                707/706

OTHER PUBLICATIONS

Galeson et al., "CodeHint: Dynamic and INteractive Synthesis of Code Snippets", in 36th International Conference on Software Engineering, ICSE (2014).*

Guo et al., "intelligent Partitioning in Distributed Optimization of Electric Power Systems", IEEE Transactions on Smart Grid, Oct. 2015; 11 Pages.

Cozzie et al., "Macho: Writing Programs with Natural Language and Examples", <http://hdl.handle.net/2142/33791>; Aug. 27, 2012; 10 Pages.

Bornmann et al., "Growth rates of modern science: A bibilometric analysis based on the number of publications and cited references"; Journal of the Association for information Science and Technology, Jan. 2014; pp. 1-28; 28 Pages.

Coliberg et al., "Repeatability and Benefaction in Computer Systems Research", A Study and a Modest Proposal; University of Arizona TR 14-04, Feb. 27, 2015, pp. 1-68; 68 Pages.

* cited by examiner

METHOD AND SYSTEM FOR EXTRACTING CONCEPTS FROM RESEARCH PUBLICATIONS TO IDENTIFY NECESSARY SOURCE CODE FOR IMPLEMENTATION

CROSS REFERENCE TO RELATED APPLICATION

This application claims priority from U.S. Provisional Patent Application Ser. No. 62/452,597, filed on Jan. 31, 2017, which is incorporated herein by reference in its entirety.

FIELD OF THE INVENTION

This disclosure relates generally to implementing technological improvements and more particularly to methodologies using source code snippets to implement a solution taught in a paper.

BACKGROUND

There is a need to rapidly analyze and evaluate a significant number of published works in a subfield to reduce uncertainty about how research implemented by other state actors would impact an organization and to focus on identifying how capabilities in different research subfields can interact to form new capabilities. New research innovations published by the public require labor-intensive processes for vetting, integrating, and testing in an experimental environment before they can be deployed in operational environments. New techniques are needed to accelerate deploying new viable technologies.

SUMMARY

In accordance with the present disclosure, a system includes: a text and bibliography topic analyzer, capable of receiving an electronic copy of a target paper, to analyze bibliography information from the target paper and to provide an output of clusters of descriptors: a text and bibliography topic comparator, responsive to the output of clusters of descriptors, to compare the output of clusters of descriptors with known existing descriptors and to identify similar clusters of descriptors from the known existing descriptors; a search term formulator, responsive to the similar clusters of descriptors, to provide search terms associated with particular descriptors; a source code selector, responsive to the search terms, to query a repository of source code snippets and to select a particular source code snippet associated with the search term; and a source code combiner, responsive to selected source code snippets, to aggregate and assemble the selected source code snippets. With such a system, an article can be analyzed in relation to the language of its subfield to determine a set of search terms that can be associated with an annotated source code snippet repository that can produce a set of snippets that are sufficient to construct a programmable implementation of a research methodology taught in the article.

In accordance with the present disclosure, a method includes: analyzing a technical paper of interest and identifying concepts within the technical paper of interest based on topic analysis among bibliometric clusters; identifying descriptions of each concept across bibliometric clusters wherein the descriptions will be of varying levels of granularity and will use different terms to describe the same concept and phenomena; using the various descriptions of a concept to create search terms to be used in a repository of annotated, searchable source code snippets; and constructing implementation of technical paper's methodologies using source code snippets. With such a method, a technique is provided to rapidly analyze and evaluate a significant number of published works in a subfield to reduce uncertainty about how research implemented by other state actors would impact an organization and to focus on identifying how capabilities in different research subfields can interact to form new capabilities.

In accordance with the present disclosure, a system is provided, including circuitry configured to: analyzing a technical paper of interest and identify concepts within the technical paper of interest based on topic analysis among bibliometric clusters; identify descriptions of each concept across bibliometric clusters wherein the descriptions will be of varying levels of granularity and will use different terms to describe the same concept or phenomena; use the various descriptions of a concept to create search terms to be used in a repository of annotated, searchable source code snippets; and construct implementation of technical paper's methodologies using source code snippets.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
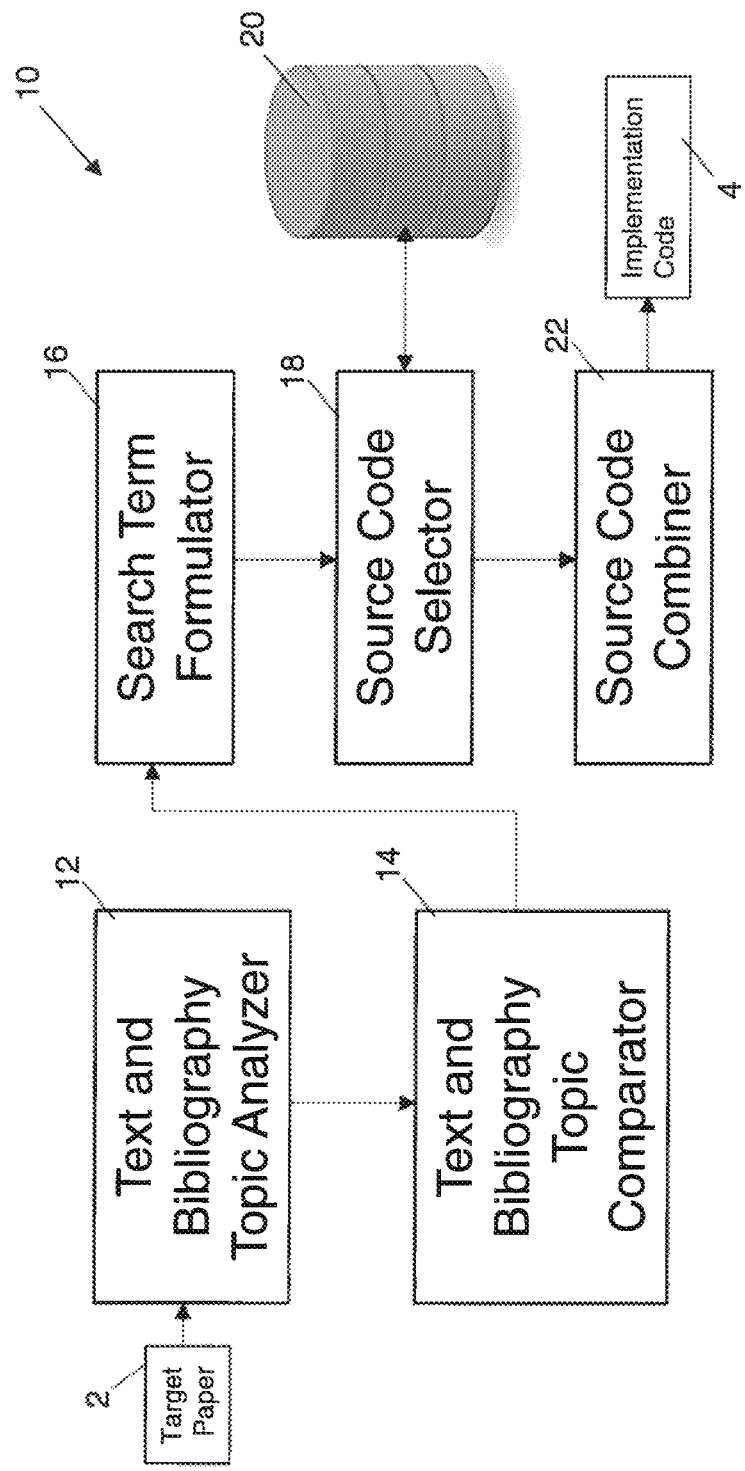
FIG. 1 is a simplified block diagram of the system according to the disclosure.

Before departing on a detailed description of the disclosure, it should be noted there is a need to rapidly analyze and evaluate a significant number of published works in a subfield to reduce uncertainty about how research implemented by other state actors would impact an organization and to focus on identifying how capabilities in different research subfields can interact to form new capabilities. New research innovations published by the public require labor-intensive processes for vetting, integrating, and testing in an experimental environment before they can be deployed in operational environments. A study conducted in 2015 at the University of Arizona demonstrated that only 32.3% of a sample of 402 Computer Science research papers could be vetted and tested by a researcher within 30 minutes apiece.

The government currently addresses this problem by employing, thousands of engineers and scientists, both civilian and military, to identify and test the new research methods before applying them to technologies in the field. With the rate of scientific publication nearly doubling every decade, organizations such as USCYBERCOM, AFRL, USAGE, and ARL are unable to appropriately survey and test new published techniques, often overlooking viable technological advances.

Our experience working with government researchers, engineers and transition partners suggests three pressing needs: (a) ability to rapidly discover, instantiate, vet, and test new theoretical methods; (b) capacity to evaluate large volumes of academic research; and (c) availability of standardized simulation environments.

The key insight behind this disclosure is that publications within an academic subfield (e.g. power grid load flow simulation, cryptographic hashes, biology) refer to similar concepts and processes. Details that may be omitted in one document can be found in another in the bibliometric cluster. Analysis of a publication in the context of other papers in its subfield bounds the search space of both concepts and candidate code blocks. Formal verification methods can be combined with programming-by-example paradigms to debug programs based on intent. By analyzing an individual article m relation to the language of its subfield, the disclosure can identify a set of search terms that can be associated with an annotated source code snippet repository that can produce a set of snippets that are probabilistically sufficient to construct a programmable implementation of the research methodology taught in the individual article. As to be described further hereinafter and referring now to FIG. 2, a method 100 and a corresponding system to implement the method is taught. The method 100 begins as shown in start block 102. As shown in step 104, a research paper of interest (target paper) is analyzed and concepts are identified within the target paper based on topic analysis among bibliometric clusters and/or with terms used within the concepts described for the topics. During this step, relevant publication corpus are collected using bibliometrics and distributional semantic vectors are calculated over the corpus. Semantec vectors are clustered into topics and sub-topics such that clusters can be labeled and associated with code block descriptors. Next, as shown in step 106, the process identifies descriptions of each concept across bibliometric clusters. These descriptions will be of varying levels of granularity and may use different terms to describe the same concept or phenomena. Note, the clusters most associated with the target paper are determined and used. Next, the various descriptions of a concept are used to create search terms to be used in a repository of annotated, searchable source code snippets as shown in step 108. By gathering code blocks matching relevant clusters, appropriate source code snippets can be selected. With this approach, items are extracted from the target paper for direct code translation. Finally, as shown in step 110, implementation of target paper's methodologies are constructed using the source code snippets. The latter provides the ability to obtain a superset of code blocks corresponding to required concepts at every level of fidelity.

The rapid rate of innovation in modern computing technologies is outstripping the ability of, the government to integrate newly discovered theories and techniques from the scientific community into existing infrastructure and operations. Newly published research requires labor-intensive processes for vetting, integration, and testing before deployment. A recent study demonstrated that only 32.3% of a sample of 402 Computer Science research papers could be vetted and tested by a researcher within 30 minutes apiece. The sheer number of research efforts, both academic and industrial, complicates discovery and utilization of viable advances in the state-of-the-art and imposes a degree of labor to the Government that is unsustainable.

This disclosure is motivated by a proposed system for revolutionizing adoption of new technologies by mining content from simulation-based research publications, instantiating their methodologies automatically, and exposing new outcomes in relevant contexts. The objective of this system is to allow a user to quickly move from a state of curiosity to a state of operation-relevant understanding of a new technology, idea process, or model. A scientist or engineer may need to do as little as provide a single paper, to this system, which will generate a programmable implementation with runnable experiments fully automatically. For more complex publications, the researcher will take an active role in the process, with the system acting as an intelligent assistant that provides, filters, and aggregates information at each step.

The methodology of the system follows a workflow similar to that as taught by Macho and referenced in "Macho: Writing Programs with Natural Language Examples", bby authors Anthony Cozzie and Samuel T. King, 2012, which is incorporated herein by reference in its entirety, a tool that used the natural language of Linux Man pages, a repository of annotated code blocks and validation tests to successfully recreate Linux functions as Java programs. While research publications do not follow the simple language of Man pages, publications within an academic subfield (e.g. cryptographic hashes) refer to similar concepts and processes. By analyzing an individual article in relation to the language of its subfield, the system will accurately map concepts to code to automatically construct a set of candidate implementations. Using subfield-specific validation tests and recently matured formal verification technologies, the system will debug a candidate implementation until it agrees with each validation test or is removed from candidacy. Even for publications whose implementation cannot be entirely automated, the system will provide dramatic improvements in the computer-aided human exploitation of new techniques.

Electric power grid research presents a compelling use case for such a system. Many, published theoretical analysis models for the grid do not adequately consider the full dynamics of the system. Furthermore, there are no simple methods for vetting these models, at scale, in a sufficient grid simulation environment. The system will produce programmable implementations of published research for such models. Military scientists and engine use these implementations to vet and validate these models across the spectrum of available works in actual power grid test environments that are otherwise inaccessible to public researchers.

A good research publication should be reproducible by a researcher in the field, barring any restrictions on intellectual property. This proposed system is capable of transforming basic research into solutions vital to America's national interests while significantly reducing the risk and costs associated with current and future research and development efforts.

Referring now to FIG. 1, a system 10 is shown where an electronic copy of a paper, here referred to as a target paper 2, is provided to a text and bibliography topic analyzer 12, where the analyzer 12 will capture the bibliography information from the paper as well as review the text to capture topics discussed in the paper into identify similar clusters of topics. Now that the paper has been analyzed, the analyzer 12 provides a bibliography cluster as well as topic clusters as an output to a text and bibliography topic comparator 14.

It should be appreciated the clusters are refined to a fine detail to provide specificity to the topic under consideration. For example, we may have a broad topic of biology which is further refined to the topic of microbiology, which is still further refined to the topic of DNA. Still further, the topic can be further refined to a new method of discovering a similar gene or alternatively a new method of discovering a different gene. The level of detail in the clustering can be determined by looking at the overlap of vocabulary and from this determination, a determination can be made to determine what cluster can be taken advantage of and used. The text and bibliography topic analyzer 12 will analyze a research paper of interest (target paper 2) and identify concepts within the target paper 2 based on topic analysis among bibliometric clusters and/or with terms used within the concepts described for the topics. By parsing a scientific publication using concept clusters and using techniques such as Bayesian model of concept flow for a methodology and Simple Natural Language Computation programming techniques, the concepts described in the target paper 2 and be implemented.

The text and bibliography topic comparator 14 takes the bibliography cluster as well as the topic clusters and compares such clusters to existing clusters known by the system 10. If similar clusters are found, then the system 10 can proceed to process the identified cluster. If no similar cluster is found, then the system 10 provide an output notifying a user that the system was not able to process the request. The text and bibliography topic comparator 14 identifies descriptors of each concept across bibliometric clusters and/or text clusters. These descriptors will be of varying levels of granularity and may use different terms to describe the same concept or phenomena.

Once the text and bibliography topic comparator 14 identifies a cluster for further processing with adequate descriptors of the concept, the descriptors are provided to a search term formulator 16. The search term formulator 16 uses the various descriptions (descriptors) of a concept to create search terms to be used to find the proper source code in a repository 20 of annotated, searchable source code snippets. It should be appreciated that many terms may exist to describe a common topic so it may be favorable to use certain terms in the repository 20 of annotated, searchable source code snippets to describe a particular source code snippet. The search term formulator 16 uses the various descriptions of a concept to formulate the terms to be used to select the proper source code snippet from the repository 20. Using a particular search term that corresponds to a particular cluster, a link can be made to a particular piece of source code to implement the topic of that cluster.

The search terms from the search term formulator 16 are fed to the source code selector 18. The source code selector 18 queries repository 20 using the selected search terms to find a source code snippet that corresponds to the selected search term. As each source code snippet is selected, the selected source code snippet is fed to the source code combiner 22. Once all of the source code snippets are fed to the source code combiner 22 for the particular concepts being implemented, the source code combiner 22 constructs an implementation of target paper's methodologies using the source code snippets and provides implementation code 4. The program can be refined using Craig Interpolations as explanations and the refined program can be based on a set of verification tests.

The repository 20 includes a database of source code associated with particular labels or fields that include the search terms associated with the particular source code snippet. The labels are used to identify the capability of the particular piece of code and the solution it implements.

From the repository 20, the system 10 pieces snippets of code together to make a solution provided by the paper. Once completed, a human may review the result and make fixes as may be appropriate. Furthermore analysis can be done on the result and changes can be made to the repository 20 or to other steps in the process to improve the results thereof.

To create the repository 20, a particular area of interest is selected. Existing open source repositories such as OpenHub, GitHub, Google Code can be used to seed the initial database corpus and to collect existing source code providing solutions for the area of interest selected. Other known solutions can also be added to the database. The source code snippets with associated labels are stored in the database to provide solutions for the various text detailed clusters.

Figure 2:
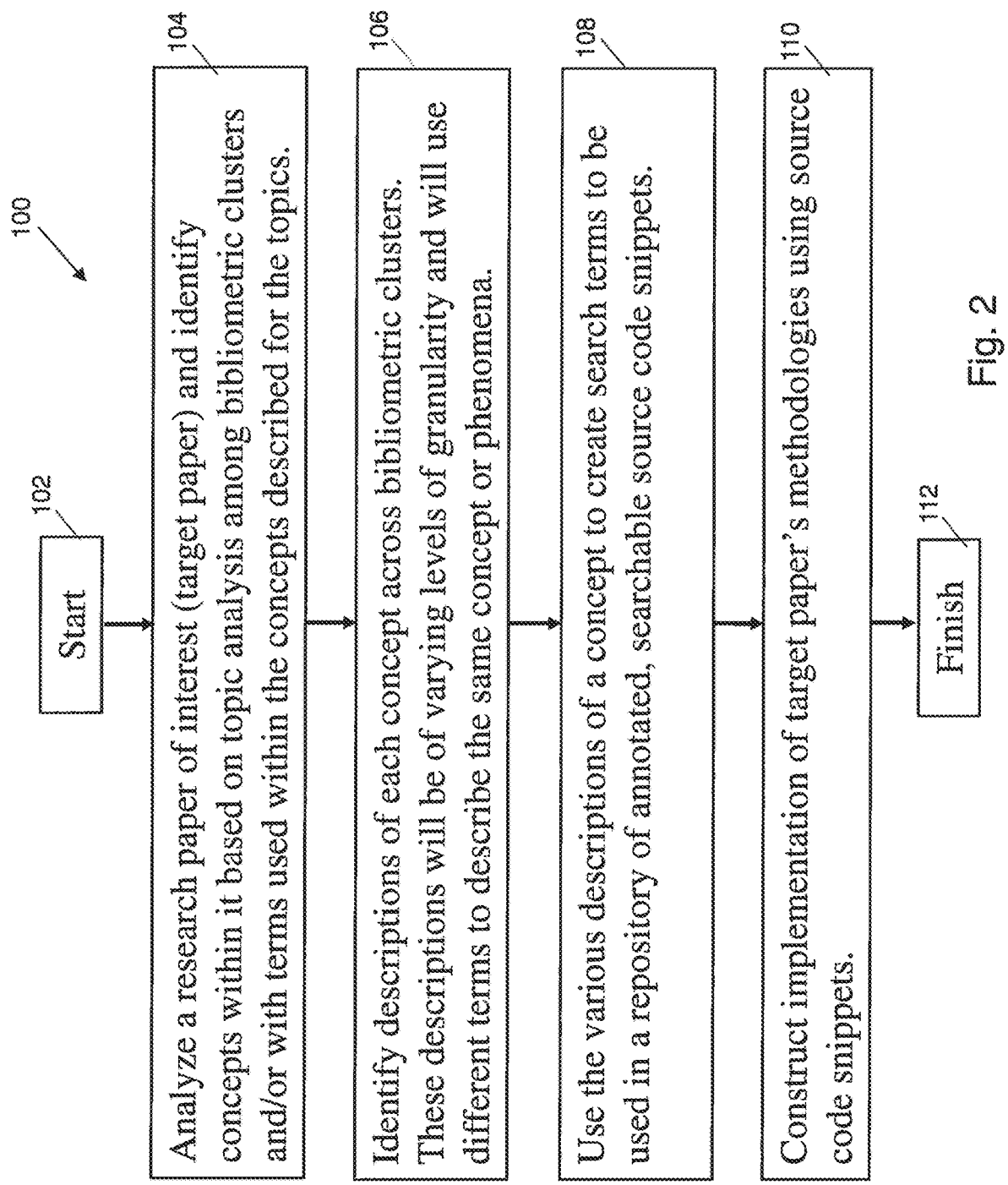
FIG. 2 is a system flow diagram of the simplest form of the method according to the disclosure.

It should now be appreciated, this disclosure describes a system and method illustrated in FIGS. 1 and 2. The disclosure begins by accessing open source research databases to collect papers of interest to the user, starting with the target paper. Automating this step eliminates the need for the researcher to repeatedly type title and author queries into, for example, Google Scholar, download each document individually, and manually look for both previous research and subsequent citations of each paper. Iterative downloads leveraging citation co-reference techniques such as those explored in IARPA FUSE can result in a suitable set of papers to form bibliometric clusters.

This disclosure teaches the use of techniques such as vector-based word similarity to then find and relate concepts from the collected set of published research. A semantic vector defines the probability with which each word in the vocabulary is likely to appear in the context of a given word. This does not create a dictionary definition of the word, but allows us to plot terms in vector space to understand their relationships. The specificity of scientific terms will require that we use small contexts, such as individual paragraphs, to calculate the word embeddings. The disclosure then clusters the semantic vectors to create a concise representation of the field. Summing the vectors for all words in a publication provides a view of the paper's relation to the various concept clusters. This disclosure includes the use of other techniques for identifying significant words to find and relate concepts from the collected research works.

This described technique can be demonstrated to work on a paper "intelligent Partitioning in Distributed Optimization of Electric Power Systems". Here again, we refer to this paper as the "target paper." The target paper describes an approach for determining the optimal partitioning for a given power grid system and optimization problem. Their approach is based on spectral clustering using techniques from both linear optimization and graph theory. Among the target paper and its cluster, we find search terms such as "AC OPF problem," "admittance matrix," and "bus voltage." The target paper's methodology is focused on spectral clustering using a Hessian and admittance matrix; other search terms will include "Lagrange multipliers," "K-means," and "affinity matrix." Not all publications in the field will relate to this same cluster. The system learns the concepts that exist within a field, the specific terms associated with those concepts, the association of each publication to each concept, and the terms in the target paper that differ from the other similar publications. Multiple terms with the same meaning, such as the terms "adjacency matrix" and "connection matrix", will both be added to the corpus of search terms. A visual and editable representation of the word clusters, similar to the ubiquitous "word cloud," can be used to describe the identified terms to a researcher attempting to implement the paper's methodology.

The system then uses these search terms to search an aggregated database of search code snippets. The code block repository for the system, culled from open source, government, and site-internal code repositories, takes this into account by annotating code blocks with concepts and relationships to subfields. In operational cases, the code repository will store subfield-specific atomic functions. In the case of the target paper and its subfield, such functions will include createAdmittance( . . . ) and acOpf( . . . ). Code blocks from modern repositories such as OpenHub, GitHub and Google Code can be used to seed the initial database corpus. Source code search tools such as SNIFF and Prospector will be employed to find, download, and annotate source code blocks for verification through hybrid symbolic and concrete (concolic) execution. The latter can be used to produce an adequate database of annotated source code snippets that can be searched using modern research terms.

As seen by our approach, concept extraction to include document clustering, topic analysis and text summarization analysis can be performed to cluster certain concepts. Code aggregation is accomplished by using natural language computation, source code sharing repositories and searching source code to match existing source code with the cluster concepts. From the existing code that implements the desired concepts, code assembly is performed using techniques such as source code synthesis, bounded model checking, concolic execution and programming by example.

Figure 3:
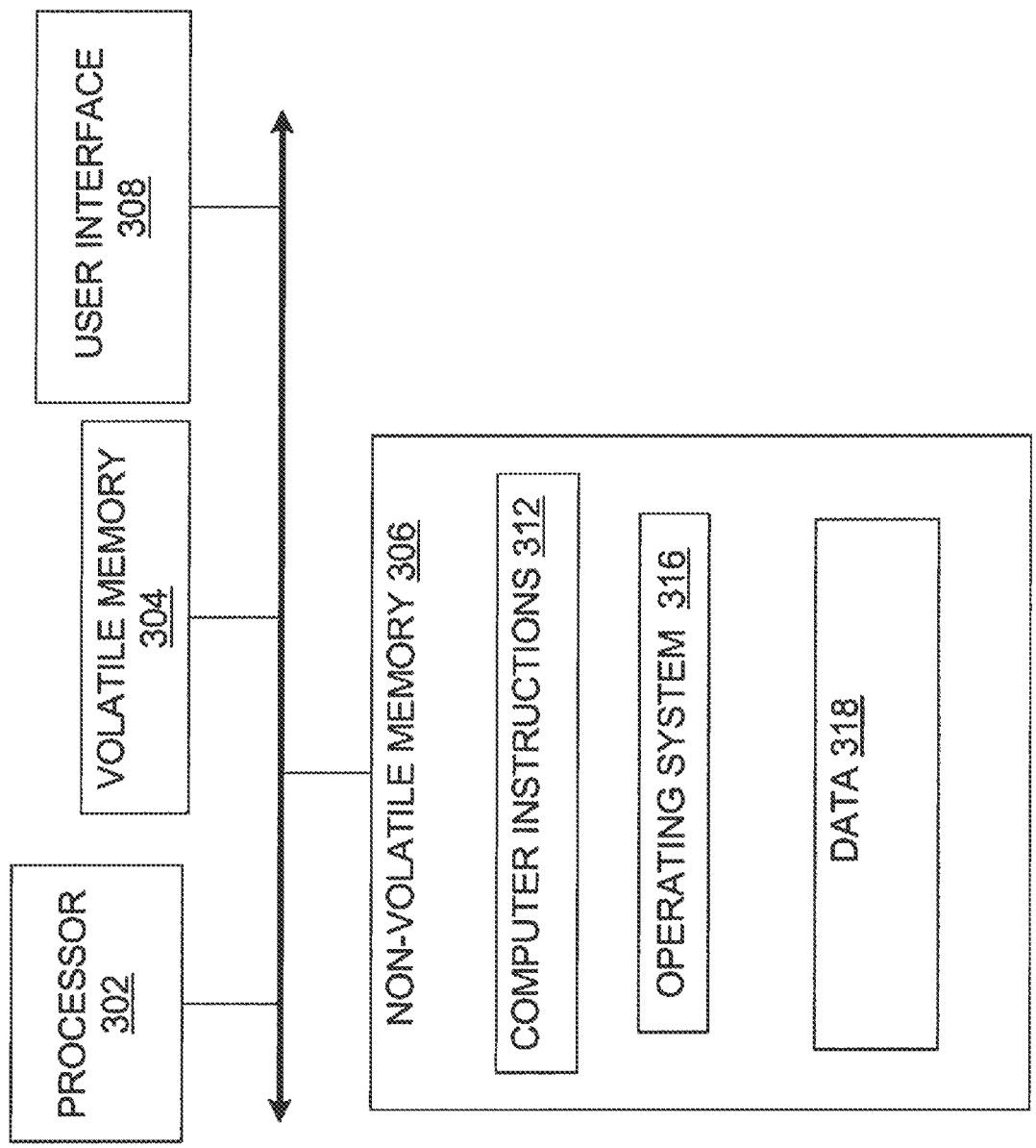
FIG. 3 is a block diagram of a computer that can be used to implement certain features of the system and to implement the method of FIG. 2.

Referring to FIG. 3, a computer includes a processor 302, a volatile memory 304, a non-volatile memory 306 (e.g., hard disk) and the user interface (UI) 308 (e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the techniques and processes described herein.

The techniques described herein are not limited to use with the hardware and software of FIGS. 1, 2 and 3, they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process may be realized as a sequence diagram. In another example, the process is not limited to a specific processing order. Rather, any of the processing blocks as described may be re-ordered, combined or removed, performed in parallel or in serial, as necessary, to achieve the results set forth above.

Having described the system 10, it should be appreciated such a system performs concept extraction where document clustering, topic analysis and text summarization analysis is performed by the text and bibliography topic analyzer 12. Tools such as VOSViewer, Sci2, Carrot2, LingPipe and others can be used to implement the concept extraction step. Next, code aggregation is performed to include source code search, natural language computation and source code sharing repositories to select the proper code to implement the concept being taught. Tools such as Merobase, GitHub, SNIFF, Infty, RunMyCode and others can be used to document and select the proper code. Finally, code assembly is performed using source code synthesis, bounded model checking, concolic execution and programming by example to implement the code to correspond to the teachings under consideration. Tools such as CodeHint, Coverity, Yogi, Z3 and others can be used to facilitate code assembly.

Figure 4:
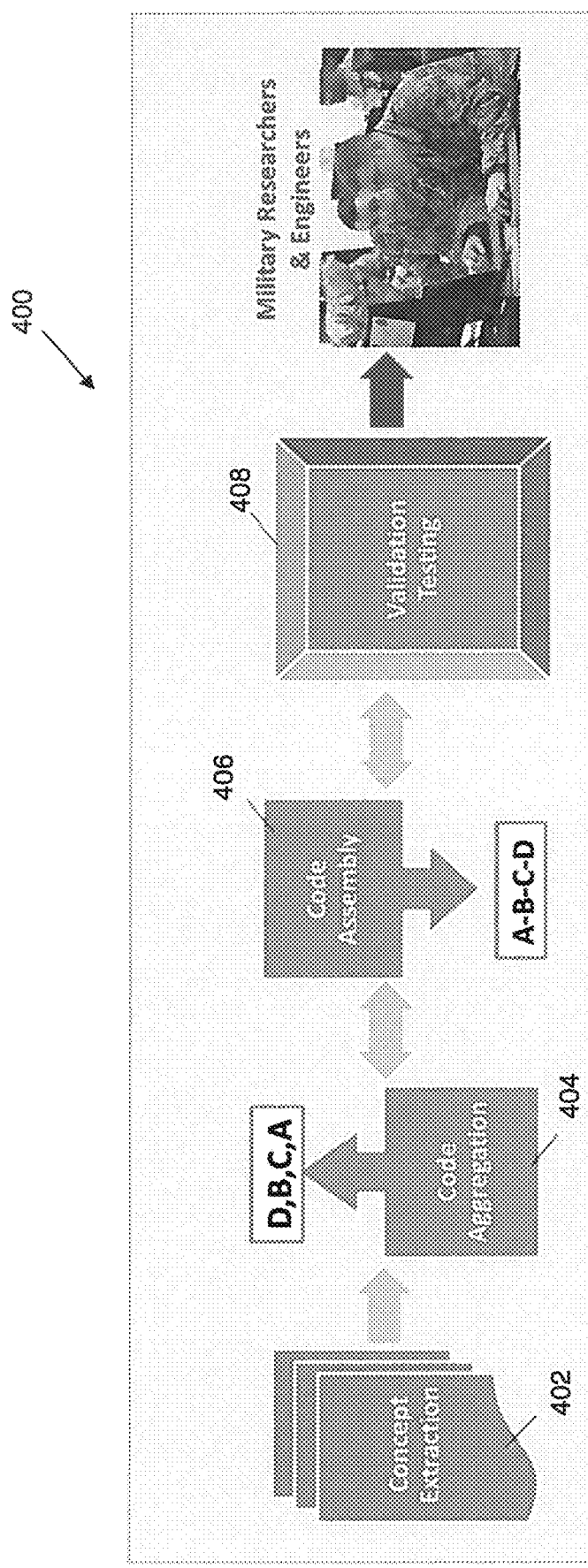
FIG. 4 is a flow diagram of a method implemented by the system.
Figure 5:
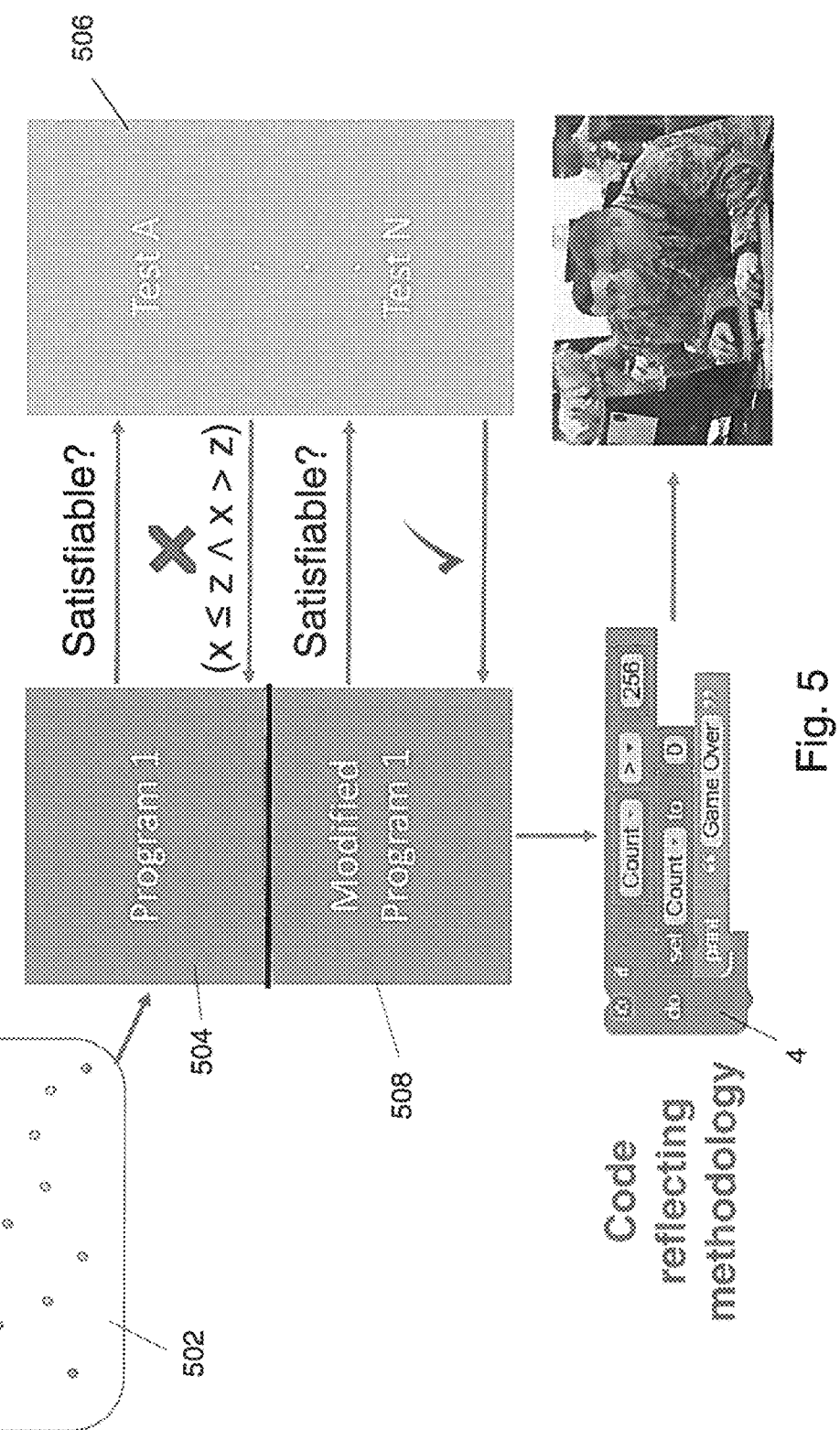
FIG. 5 is a flow diagram of a method implemented by the system.

Referring now to FIG. 4, a method 400 of programmable implementation that reflects the research paper's methodology using a set of code blocks with the addition of a set of validation tests is shown. As described above, and shown in step 402, a research paper of interest (target paper) is analyzed and concepts are identified and extracted within the target paper based on topic analysis among bibliometric clusters and/or with terms used within the concepts described for the topics. Descriptions of each concept are identified across bibliometric clusters. These descriptions (descriptors) will be of varying levels of granularity and may use different terms to describe the same concept or phenomena. Note, the clusters most associated with the target paper are determined and used. Next, various descriptors of a concept are used to create search terms to be used in a repository of annotated, searchable source code snippets to aggregate the code as shown in step 404. By gathering code blocks matching relevant clusters, appropriate source code snippets can be selected. Next as shown in step 406, source code snippets are selected and assembled to provide an implementation program that implements the concepts taught in the target paper where the system combines and synthesize code blocks into runnable programs. As shown in step 408, the step of validation testing is accomplished by quickly verify runnability using probabilistic data flow analysis and concolic execution as well as using algorithms from CodeHint to identify highest likelihood code for stitching blocks together. Programs are ordered for testing based on results of probabilistic data flow analysis. Referring now to FIG. 5, candidate programs 502 (source code snippets) are selected and assembled into a program 504. As shown in step 506, tests are performed where for each individual program p, one or more of the following steps are accomplished: (a) determine mutual satisfiability between p and each verification test as a pair of programs; (b) for pairs that are mutually unsatisfiable, analyze Craig interpolant (explanation for unsatisfiability0); (c) determine erroneous program area and correcting operation based on Craig interpolant and other validation test results: inform synthesis tools of error location and needed corrections and refine p; and (d) repeat until all verification tests have passed or no known corrections can be made. Once satisfied, a modified program 508 is finalized and provided as the implementation code 4. With such an approach, the ability to synthesize, identify, and refine a program to agree with a corresponding set of validation tests can be a 100 times faster than a human over the same research work.

It should now be appreciated, the disclosure teaches an apparatus, comprising circuitry configured to: take a research paper of interest (target paper) and identify concepts within it based on topic analysis among bibliometric clusters; identify descriptions of each concept across bibliometric clusters wherein the descriptions will be of varying levels of granularity and will use different terms to describe the same concept or phenomena; use the various descriptions of a concept to create search terms to be used in a repository of annotated, searchable source code snippets; and construct implementation of target paper's methodologies in implementation code using source code snippets.

Elements of different embodiments described herein may be combined to form other embodiments not specifically set forth above. Other embodiments not specifically described herein are also within the scope of the following claims.

What is claimed is:

1. A system comprising:
    a memory; and
    one or more processors operably coupled to the memory, the one or more processors configured to execute instructions stored in the memory that, when executed, cause the one or more processors to,
        receive, by a text and bibliography topic analyzer, an electronic copy of a target paper having bibliography information;
        analyze, by the text and bibliography topic analyzer, the bibliography information from the target paper to determine clusters of descriptors of concepts relating to the bibliographic information;
        compare, by a text and bibliography topic comparator, responsive to an output of clusters of descriptors by the text and bibliography topic analyzer, the clusters of descriptors of concepts with descriptors from known existing publications and identify similar clusters of descriptors of concepts from the known existing publications;
        identify, by the text and bibliography topic comparator, descriptors of one or more concepts from the identified similar clusters of descriptors;
        for each concept of the one or more concepts, formulate, by a search term formulator, search terms associated with the descriptors of the concept, the search terms for use in selecting source code snippets from a repository of annotated, searchable source code snippets;
        query, by a source code selector, for each search term, the repository of source code snippets and select a source code snippet associated with the search term; and
        assemble, by a source code combiner, the selected source code snippets to provide a program such that the program can be tested to generate an implementation of the target paper's methodologies.

2. The system of claim 1 wherein the text and bibliography topic analyzer analyzes topic clusters and provides an output of clusters of descriptors relating to the topic clusters.

3. The system of claim 1 wherein the text and bibliography topic analyzer analyzes text to capture topics discussed in the paper to identify similar clusters of topics and provides an output of clusters of descriptors relating to the similar clusters of topics.

4. The system of claim 3 wherein the descriptors are of varying levels of granularity and may use different terms to describe the same concept or phenomena.

5. A method comprising:
    analyzing bibliography information of a target paper of interest and identifying clusters of descriptors of concepts within the target paper of interest relating to the bibliography information;
    comparing the clusters of descriptors of concepts with descriptors from known existing publications and identifying similar clusters of descriptors of concepts from the known existing publications;
    identifying descriptors of one or more concepts from the identified similar clusters of descriptors;
    formulating, for each concept of the one or more identified concepts, search terms associated with the descriptors of the concept, the search terms for use in selecting source code snippets from a repository of annotated, searchable source code snippets; and
    querying the repository of source code snippets and selecting a source code snippet associated with the search term such that the selected source code snippets can be presented to a user.

6. The method as recited in claim 5 wherein the analyzing the target paper of interest and identifying concepts within the target paper of interest further comprises analyzing concepts using terms used within the concepts.

7. The method as recited in claim 5 wherein the descriptors are of varying levels of granularity.

8. The method as recited in claim 5 wherein the descriptors use different terms to describe the same concept or phenomena.

9. A system, comprising circuitry configured to:
    analyze bibliography information of a target paper of interest and identify clusters of descriptors of concepts within the target paper of interest relating to the bibliography information;
    compare the clusters of descriptors of concepts with descriptors from known existing publications and identify similar clusters of descriptors of concepts from the known existing publications;
    identify descriptors of one or more concepts from the identified similar clusters of descriptors;
    formulate, for each concept of the one or more identified concepts, search terms associated with the descriptors of the concept, the search terms for use in selecting source code snippets from a repository of annotated, searchable source code snippets; and query the repository of source code snippets and select a source code snippet associated with the search term such that the selected source code snippets can be presented to a user.

10. The system of claim 9 wherein the identification of clusters of descriptors of concepts within the target paper of interest is based on topic analysis among bibliometric clusters.

11. The system of claim 9 wherein the descriptors are of varying levels of granularity.

12. The system of claim 9 wherein the descriptors use different terms to describe the same concept or phenomena.

\* \* \* \* \*